March 29, 1955  L. F. DASSE  2,705,164
SEAL
Filed April 8, 1952  3 Sheets-Sheet 2

INVENTOR.
L. F. Dasse
BY Robbs Robb
Attorneys.

March 29, 1955 L. F. DASSE 2,705,164
SEAL
Filed April 8, 1952 3 Sheets-Sheet 3

INVENTOR.
L. F. Dasse
BY
Attorneys

United States Patent Office 2,705,164
Patented Mar. 29, 1955

2,705,164

SEAL

Lester F. Dasse, St. Joseph, Mich., assignor, by mesne assignments, to Lambert Brake Corporation, St. Joseph, Mich., a corporation of Michigan Application April 8, 1952, Serial No. 281,201

9 Claims. (Cl. 288—3)

The present invention relates to exclusion seals, and more particularly to an improved seal construction for sealing relatively rotatable members against the passage of dust, dirt, mud, and/or lubricants or other fluids, therebetween.

One of the primary objects of the invention is to provide a seal which is relatively inexpensive, simple to manufacture as compared with conventional seals of the same class, and which is susceptible of rapid and easy assembly, installation and/or disassembly, with little or no possibility of human error or damage of the sealing elements during handling, assembly or installation of the seal, and which is also durable and long-lasting during use.

Another object is to provide a seal which is especially well-suited for sealing installations in which one of the relatively rotatable parts operates at high speed where the problems of effective and long-lasting sealing are most critical. This object is preferably attained by the provision of an improved seal having relatively rotatable coacting sealing parts, these sealing parts providing relatively light frictional contact and consequent slight interference therebetween, with attendent long life of the sealing parts.

A further object of the invention is to provide a seal which produces a compound sealing action between the relatively rotatable parts thereof, this compound sealing action being accomplished by the provision of a plurality of sealing contacts within the seal construction.

Conventionally, seals of the class of the present invention are so constructed as to be primarily applicable in installations where the radial relation between the relatively rotatable members to be sealed is fixed and does not vary. However, when this radial relation is varied beyond very limited tolerances, the effectiveness as well as the life of conventional seals is substantially impaired, either by failure to provide sufficient contact between the relatively rotatable members, or by providing such a great frictional contact as to result in undue and too rapid wear.

In addition, conventional seals are usually rapidly destroyed or "beat out" in installations where there is radial play between the relatively rotatable members being sealed, due to worn or loose bearings or the like, and in the case of imperfections in one or the other of the relatively rotatable members, or in the case of slight eccentricities of one of the relatively rotatable members, an efficient seal is not attainable by conventional seal constructions.

Accordingly, still another object of this invention is to provide a seal which automatically compensates for variations in the radial or lateral relation between the relatively rotatable parts, which automatically compensates for radial play between such parts, and which automatically compensates for eccentricities of one or the other of the relatively rotatable parts.

The foregoing objectives are preferably attained by the provision of a U-shaped metal cage or housing having opposed resilient sealing lips therein, these sealing lips being frictionally engaged with an intermediate disc or middle ring member which is carried by a resilient member adapted to engage the opposite side walls of the cage in sealing relation thereto.

Other and further objects of the invention will be hereinafter described and the novel features thereof defined in the appended claims.

Figure 5:
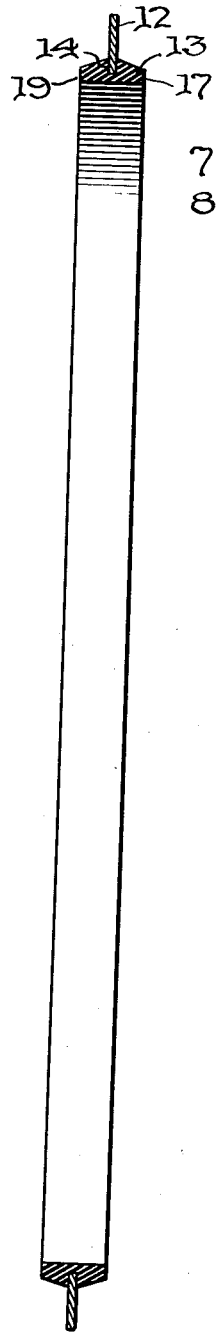
Fig. 5 is a fragmentary view in section and on a substantially enlarged scale, showing the portions of the seal embraced within the broken lines of Fig. 1, and illustrating by means of arrows the compound sealing action of the seal construction.
Figure 8:
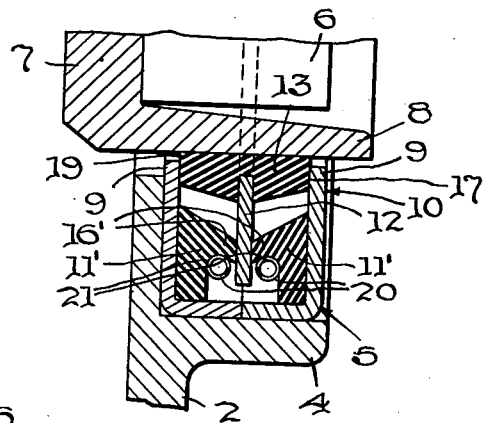
Figure 9:
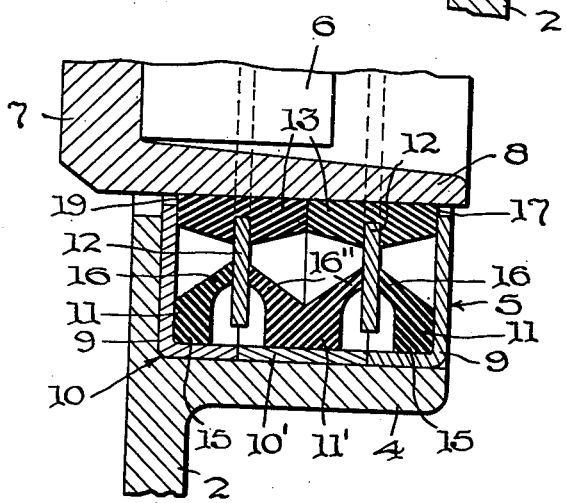

Fig. 8 is an enlarged sectional view generally corresponding to Fig. 5, showing a modified form of seal construction in which the sealing lips are inverted so as to incline in a direction opposite to that in Fig. 5, and employing garter springs to encircle the sealing lips to prevent reduction of the sealing pressure of the lips against the middle ring when the rotatable member is operated at relatively high speed; and Fig. 9 is a view generally corresponding to Fig. 5, showing a still further modified form of the seal construction which provides additional multiple sealing contacts as may be required for extreme service conditions.

Figure 1:
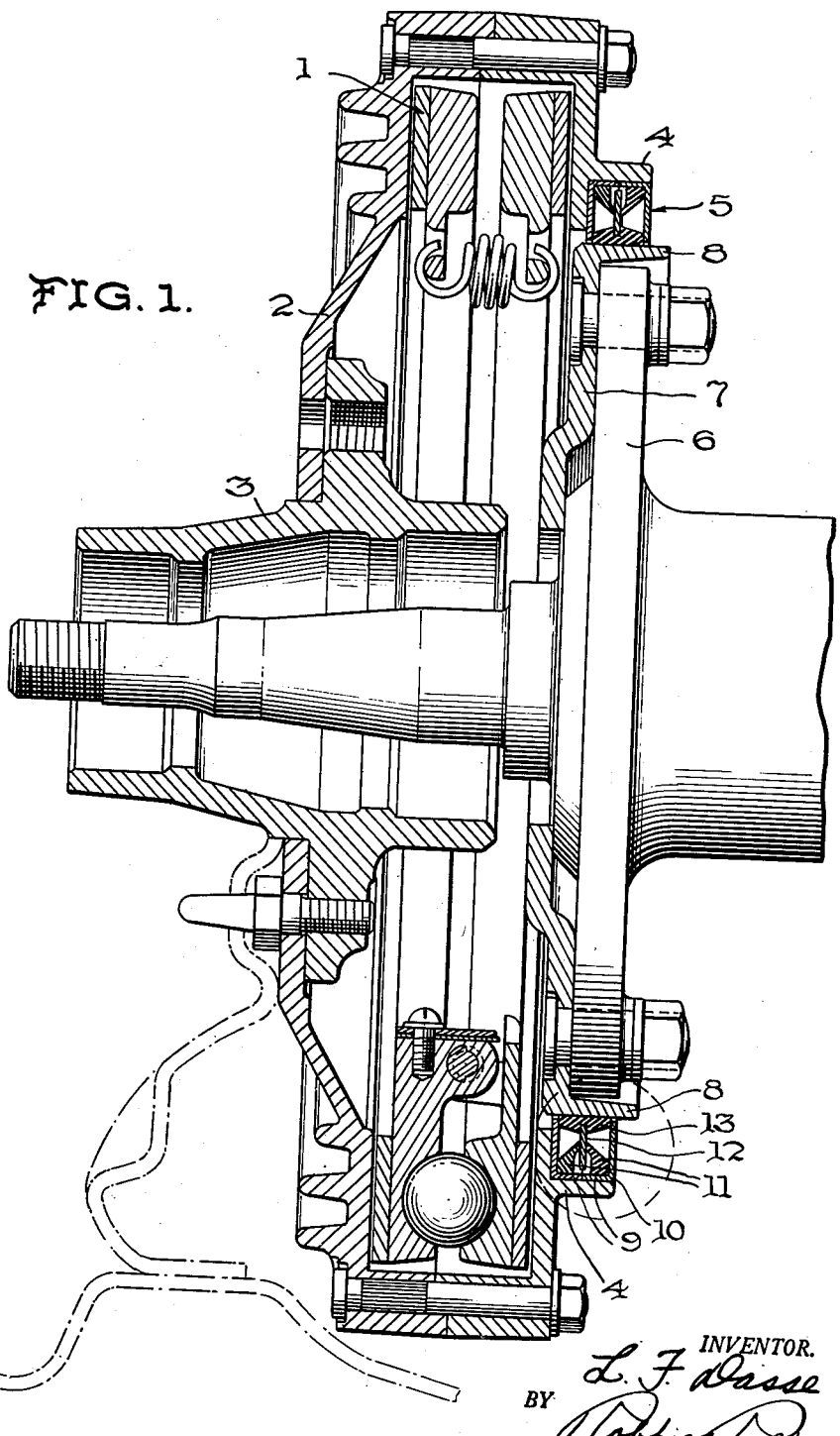
Fig. 1 is a sectional view of a typical installation of a seal made in accordance with one form of the invention, this view showing the seal in its operative position between a rotatable brake housing and a relatively stationary backing plate of a disc brake assembly.
Figures 2, 3, 4:
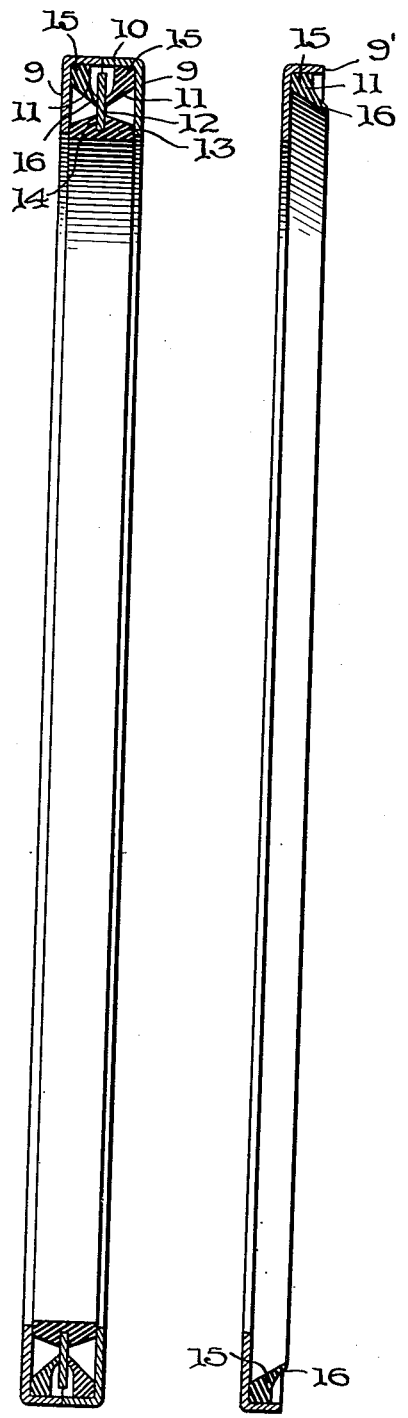
Fig. 2 is a sectional view of an assembled seal of the type shown in Fig. 1, but on a slightly enlarged scale.
Fig. 3 is a detail view in section, showing one half-section of the seal cage of Fig. 2, with its resilient sealing lip.
Fig. 4 is a detail view in section, showing the central sealing disc member or middle ring carried by its resilient support.

Like reference characters denote corresponding parts in the several figures of the drawings, wherein 1 generally denotes a well-known disc brake construction or assembly, including a rotatable housing 2 carried by wheel-mounting hub 3 of a wheeled vehicle or the like, the housing 2 having a laterally projecting annular flange 4 on the inboard side thereof, forming an annular seat for a seal as generally denoted at 5. The housing 2, with its interior braking mechanism enclosed within the same, coacts with a relatively stationary backing or adapter plate 7 fixed to a flange 6 on the axle mounting of the wheel assembly, with the backing or adapter plate 7 forming a closure for the inboard side of the brake housing 2. The adapter or backing plate 7 is preferably provided with an annular marginal flange 8 disposed in opposed spaced relation to the flange 4 of the brake housing 2, and in order to prevent or exclude water, mud, road dust, dirt and the like, from entering the brake, the seal 5 is adapted to be installed between the flanges 4 and 8, as best shown in Fig. 1.

The disc brake construction 1 forms no part of the present invention, and is shown merely as illustrative of one operative application of the improved seal construction 5 which constitutes the essence of this invention. For a detailed description of the brake construction, reference may be had to Patent No. 2,563,759, dated August 7, 1951, and still more particularly to co-pending application Serial No. 238,283, filed July 24, 1951, now Patent No. 2,595,860, issued May 6, 1952.

According to the form of the seal construction shown in Figs. 1 to 6 inclusive, the seal 5 comprises a pair of annular metal cage or housing sections 9, each of which is shown as being L-shaped in cross-section, these cage sections, when assembled together in opposed abutting relation, forming an annular U-shaped cage or housing 10. The cage sections 9 preferably abut on a central plane at a right angle to the axis of the seal assembly.

Carried by each section 9 of the cage 10 is a rubber or other resilient sealing member 11. These members 11 extend entirely around their respective cage sections, and frictionally engage at their free edges with an annular metal disc or ring 12 which is centrally located between the complementary cage sections 9, and which is supported by an annular rubber or other resilient ring 13. The resilient ring 13 is preferably of sufficient width as to frictionally engage the opposed rigid side walls of the cage 10, and may be of any suitable cross-section. Extended about the outer periphery of the resilient ring 13 is a groove 14 in which the inner peripheral edge of the disc or middle ring 12 is seated, as clearly shown in Figs. 1, 2, 4 and 5.

The sealing members 11 are preferably molded in the respective cage sections 9, or otherwise may be suitably bonded thereto, and the resilient ring 13 may or may not be bonded or molded on the disc or middle ring 12, as desired or required for a particular application of the seal.

In molding or forming the sealing members 11, they are each preferably provided with a relatively heavy base or attaching portion 15 of substantial cross-section, from which is extended a relatively thin free lip portion 16 projecting angularly therefrom towards the axis of the seal assembly, said lips 16 of both cage sections 9 being engageable with the central disc or middle ring 12 on final assembly of the seal construction.

Figure 6:
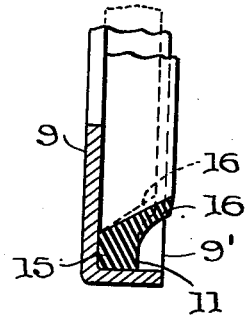
Fig. 6 is a fragmentary view in section and on an enlarged scale, showing one half-section of the U-shaped seal cage of Figs. 1 and 2, with its resilient sealing lip shown in full lines in its initial molded and unassembled position, and also showing the sealing lip in broken lines in the position it assumes upon assembly of the seal with the coacting middle ring or disc.

As best seen in Fig. 6, the portion 16 of each sealing member 11 is so molded or formed as to project beyond the inner edge 9' of its respective cage section 9 prior to assembly with the complementary cage section, as shown in full lines in this figure. When the seal is completely assembled and the lips 16 are engaged with the central disc or middle ring 12, the lips 16 assume the position shown in broken lines in Fig. 6, and by reason of the inherent resiliency of the lips 16 when they are forced out of their initial relaxed condition on assembly of the cage sections, the lips 16 will press against the central disc or middle ring 12 with a relatively light pressure, but with sufficient pressure to produce an effective sealing contact with the central disc or middle ring. This contact is preferably maintained with a minimum of friction between the lips 16 and the central disc or middle ring 12, which assures long life of the lips and the sealing unit as a whole.

On installation of the seat unit 5 in a brake assembly as shown in Fig. 1, one of the cage or housing sections 9 having its sealing member 11 carried thereby, is pressed tightly within the confines of the annular flange 4 on the brake housing 2, after which, the central disc or middle ring is inserted within the confines of the flange 4 until it rests against the lip portion 16 of the sealing member 11. Thereafter, the other complementaly cage section 9 with its sealing member 11 is pressed within the annular flange 4 until its inner marginal edge 9' abuts against the corresponding marginal edge 9' of the first-mentioned cage section, thereby putting the lips 16 of the resilient sealing members 11 under light stress or pressure against the central disc or middle ring 12. With the aforementioned parts of the seal unit 5 assembled in the brake housing 4, and before the brake assembly is mounted on the wheel-mounting, the resilient ring 13 is applied onto the central disc or middle ring 12, with the inner marginal edge of this disc or ring seating in the peripheral groove 14. Thereupon, the entire brake assembly may be applied onto the wheel-mounting hub 3, and the resilient ring 13 may be pressed onto the flange 8 of the stationary backing plate or adapter 7 as the brake assembly is moved to its fully assembled position as illustrated in Fig. 1. When so mounted, the resilient ring 13 and the central disc or middle ring 12 together constitute a relatively stationary seal element, and the cage 10 with the sealing members 11 together constitute a relatively rotatable seal element. In such an installation, the resilient ring 13 will automatically compensate for any irregularities in the surface of flange 8 on which it is mounted by snugly fitting the same therearound. In addition, any radial play or eccentricity between the flanges 4 and 8 is automatically compensated for by the seal unit 5, by reason of the fact that the resilient ring 13, along with the central disc or middle ring 12, is free to move into and out of the cage 10 in a radial direction, within limits determined by the radial thickness of the ring 13 and the radial thickness of the cage 10, as compared with the distance between the flanges 4 and 8.

The sealing action of this seal construction is of a multiple nature, as represented by the arrows in Fig. 5, since mud, water, dirt, dust or other foreign matter, would have to first penetrate the seal between the inside face of the inboard side of the cage 10 and the contacting face 17 of the resilient ring 13, and any foreign matter that succeeds in passing this point must then pass between the inboard sealing lip 16 and the adjacent face of the central disc or middle ring 12, into the annular chamber 18 defined between the two sealing members 11. From this chamber, the foreign matter would then have to pass by the outboard lip 16 and the outboard face of the central disc or middle ring 12, and then would still have to pass through the fourth sealing contact between the outboard face 19 of the sealing ring 13 and its contacting inner face of the outboard side wall of the cage 10.

Wear of the sealing elements may be still further minimized by pre-packing the seal unit 5 with a suitable lubricant, which would be particularly advantageous where the seal is utilized in a dry environment, such as in the illustrated brake assembly. Also, in the case of brakes of this type, dust originating from wear of the brake linings within the brake housing is effectively occluded or excluded from passing by the elements of the seal unit into the zone of the central disc or middle ring of the latter, and which otherwise might cause undue wear of the lips 16 of the sealing members 11 by the abrasive action of the lining dust particles.

Figure 7:
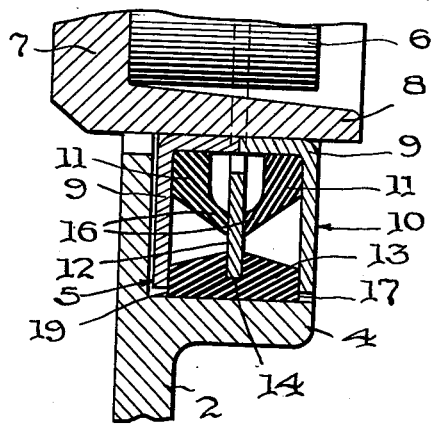
Fig. 7 is a fragmentary sectional view generally corresponding to Fig. 5, but showing the seal reversed, so that the cage is carried by the relatively stationary member, and the middle ring or disc is carried by the relatively rotatable member.

Instead of mounting the seal unit 5 in the manner shown in Fig. 1, wherein the sections 9 of the cage 10 are pressed tightly within the confines of the flange 4 on the rotatable brake drum 2, the elements of the seal unit may be reversed as more particularly illustrated in the modified arrangement illustrated in Fig. 7. According to the latter construction, the sections 9 of the cage 10 are tightly pressed onto the flange 8 of the stationary backing plate or adapter 7, while the resilient ring 13 is snugly pressed within the annular flange 4 of the brake housing 2. In this arrangement, the central disc or middle ring 12 occupies the same relation to the sealing members 11 of the cage sections 9, as in the form first described herein, and the sealing action is the same as that hereinbefore described. Since the sealing members 11 in the arrangement illustrated in Fig. 7 are relatively stationary, because of the fact that the cage 10 is mounted on a stationary backing plate 7, there will be no effect of centrifugal force upon these members in this particular arrangement, regardless of the speed of rotation of the brake housing, whereas in the arrangement disclosed in Fig. 1, the action of centrifugal force on the sealing members 11 tends to urge the lips 16 into firmer contact with the central disc or middle ring 12, with greater pressure, the higher the speed of rotation of the brake housing. In order to offset this increased pressure of the lips 16 on the central disc or middle ring 12 at those relatively high speeds which would tend to produce excessive wear on the lips 16, the sealing members may be modified to correspond with the form shown in Fig. 8, wherein the resilient members 11' are provided with lip portions 16' which are inclined in a direction opposite to the inclination illustrated in Fig. 5, that is to say, the inclination is outwardly and away from the axis of rotation of the brake, so that the centrifugal force induced by high speed rotation of the brake housing would tend to urge the lips 16' of the seal unit 5 away from the central disc or middle ring 12. To prevent any substantial reduction in pressure between the lips 16' and the central disc or middle ring 12, in this arrangement, the seal unit is provided with annular spring members or garter springs 20, there being one of these garter springs for each of the sealing members 11' of the seal unit. Each of the sealing members 11' is provided with an annular recess 21 in which its garter spring is seated. Except for these changes in the elements noted above, the seal unit of Fig. 8 is the same as that of Fig. 5.

A still further modified form of seal unit is illustrated in Fig. 9, which generally corresponds to Fig. 5, except that an additional middle cylindrical cage section 10' is disposed between the two L-shaped cage sections 9, with the latter sections 9 having abutting contact with the respective opposite ends of the middle section 10'. This middle cage section 10' is provided with an intermediate sealing member 11'', which, in this form, is provided with two oppositely inclined sealing lips 16'' which are respectively disposed in opposed relation to the sealing lips 16 of the respective cage sections 9. In this arrangement, two central discs or middle rings 12 are provided for sealing contact with the two pairs of lips 16, 16″, and in mounting the two discs or rings 12, either two separate resilient rings 13, each corresponding to the element 13 in Fig. 5, may be used, or this mounting ring may be made in the form of a single ring of greater width and provided with two peripheral grooves to receive the respective central discs or middle rings 12.

This modified multiple form of seal construction shown in Fig. 9 affords substantially twice the effective sealing action as the single type of unit disclosed in Fig. 5, and it will be understood that by still further increasing the number of central cage sections 10′ with the double-tip sealing member 11′, with corresponding increase in the number of central discs or middle rings 12, the sealing action can be multiplied to any extent desired or that may be required for extreme service conditions.

It will be further understood that the modified arrangement of the seal unit in Fig. 9 may be reversed like that of the single unit to correspond generally with the arrangement disclosed in Fig. 7, and by the same token, the inclination of the lips of the sealing members in Fig. 9 may be inverted to correspond with the arrangement of the lips as shown in Fig. 8, in which event, each of the lips would preferably be provided with a garter spring to retain the lips against displacement from contact with the sealing rings as the result of the action of centrifugal force at high speeds.

It will be obvious from the foregoing that the seal of this invention is not limited to use with brakes either of the type as specifically illustrated and described herein, or otherwise, but is readily applicable to many and diverse applications, including clutches, shafts, axles, and other rotary parts which are journaled in a relatively stationary member. In this connection, it will be readily understood from reference to Figs. 1 and 7, that the part designated 7 may have the form of a shaft or other rotary part, instead of being stationary, and the part designated 2 may correspond to a relatively stationary housing or other element in which the part 7 is journaled or otherwise free to rotate relative thereto.

When seals of the type corresponding to the present invention are utilized to seal against the admission or loss of fluid into or from a container or other housing or chamber, such as a clutch housing, crank-case, pump housing or the like, where some fluid pressure may be exerted tending to force the fluid through the seal, the sealing contact between the resilient lips and the interior sealing rings or discs becomes greater as the fluid pressure on the lips increases in the arrangements as more particularly illustrated in Figs. 1, 5, 7 and 9, due to the angular relation of the sealing lips with respect to the sealing rings.

While the specific details have been herein shown and described, the invention is not confined thereto as changes and alterations may be made without departing from the spirit thereof as defined by the appended claims.

I claim:

1. A seal of the class described for use with a rotatable member and a relatively stationary member, comprising a U-shaped cage adapted to be carried by one of the members, ring means of resilient material adapted to be carried by the other of said members, said ring means extending into the open side of said cage and being sealingly engaged with the opposed inner side faces thereof, relatively rotatable cooperatively engaged sealing means carried by said cage and said ring means, respectively, said last-mentioned sealing means comprising an annular rigid disc carried by said ring means and projecting into said cage, and a pair of resilient sealing members secured in said cage at opposite sides of the disc, said sealing members each having a base of substantial cross-section fixed to said cage and a relatively thin lip portion projecting from said base into engagement with the respective opposite sides of said disc.

2. A seal as defined in claim 1, wherein said lip portion of each of said sealing members is disposed at an angle inclined outwardly to the axis of said disc.

3. A seal as defined in claim 1, wherein said lip portion of each of said sealing members is disposed at an angle inclined inwardly to the axis of said disc.

4. A seal of the class described, comprising a plurality of complementary cage sections, each of said sections having a resilient sealing member carried thereby, said sections together forming a U-shaped annular cage, said sealing members each having a base of substantial cross-section secured to said cage at the bottom thereof and engaged with the adjacent bottom and side walls of the cage and also having a resilient sealing lip projecting from said base, a rigid disc extending into said cage between said sealing members, said rigid disc and said cage being rotatable relative to each other, and a resilient ring on which said disc is mounted, said ring being disposed in the open side of said cage and sealingly engaging the opposed inner faces thereof.

5. A seal of the class described, comprising a multipart cage formed of complementary cage members abutting on a central plane, resilient sealing means having a base of substantial cross-section molded in each of said cage members, said sealing means having a resilient lip portion initially projecting beyond the plane on which said cage members abut, a ring projecting into said cage, and an annular disc carried by said ring and confined within said cage, said disc being disposed between the sealing means in said cage members and flexing the same into a position resiliently stressed into sealing contact with said disc, and said ring sealingly engaging the cage to close the same.

6. A seal of the class described, for use with a rotatable member and a relatively stationary member, comprising a U-shaped cage adapted to be carried by one of the members, ring means of resilient material adapted to be carried by the other of said members, said ring means extending into the open side of said cage and being sealingly engaged with the opposed inner side faces thereof, relatively rotatable cooperatively engaged sealing means carried by said cage and said ring means, respectively, said last-mentioned sealing means comprising an annular rigid disc carried by said ring means and projecting into said cage, and a pair of resilient sealing members secured in said cage at opposite sides of the disc, said sealing members each having a base of substantial cross-section fixed to said cage and a relatively thin lip portion projecting from said base into engagement with the respective opposite sides of said disc, and means embracing the respective resilient sealing members for restraining the same against displacement away from said disc.

7. A seal as defined in claim 6, wherein said sealing member is provided with an annular recess therein in which the restraining means is seated.

8. A seal as defined in claim 1, wherein said cage includes two complementary annular cage sections of L-shape cross-section disposed in axially spaced relation to each other, and an intermediate cylindrical cage section having abutting contact with the complementary L-shaped sections aforesaid, the sealing means includes a plurality of pairs of opposed resilient sealing members as aforesaid, and a plurality of discs as aforesaid respectively interposed between each pair of opposed sealing members in sealing engagement therewith.

9. A seal as defined in claim 8, wherein said ring means includes a pair of similar ring members disposed in side-by-side relation to one another.

References Cited in the file of this patent

UNITED STATES PATENTS

| | | |
|---|---|---|
| 2,192,305 | Gilman | Mar. 5, 1940 |
| 2,367,403 | Kosatka | Jan. 16, 1945 |

FOREIGN PATENTS

| | | |
|---|---|---|
| 544,881 | Great Britain | Apr. 30, 1942 |
| 936,483 | France | of 1948 |